(12) United States Patent
Kamada et al.

(10) Patent No.: US 8,219,289 B2
(45) Date of Patent: Jul. 10, 2012

(54) VEHICLE CONTROL APPARATUS, VEHICLE CONTROL METHOD, COMPUTER PROGRAM FOR IMPLEMENTING SAME METHOD, AND DATA STORAGE MEDIUM STORING SAME COMPUTER PROGRAM

(75) Inventors: Atsushi Kamada, Nishikamo-gun (JP); Yasushi Hanaki, Aichi-gun (JP); Naoki Taki, Okazaki (JP); Akira Nagasaka, Nagoya (JP); Yoshinobu Nozaki, Anjo (JP); Akira Nagae, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 604 days.

(21) Appl. No.: 12/310,282

(22) PCT Filed: Aug. 31, 2007

(86) PCT No.: PCT/IB2007/002509
§ 371 (c)(1),
(2), (4) Date: Feb. 19, 2009

(87) PCT Pub. No.: WO2008/026059
PCT Pub. Date: Mar. 6, 2008

(65) Prior Publication Data
US 2009/0326767 A1    Dec. 31, 2009

(30) Foreign Application Priority Data
Sep. 1, 2006  (JP) .................. 2006-237924

(51) Int. Cl.
G06F 7/00   (2006.01)
G06F 17/00  (2006.01)
G06F 19/00  (2006.01)

(52) U.S. Cl. ............... 701/51; 701/22; 701/36; 701/53; 701/65; 477/80; 477/92; 192/220.2

(58) Field of Classification Search ............... 701/22, 701/36, 48, 51, 53, 65, 70, 71, 81; 477/92, 477/190, 197, 198; 192/219, 219.1, 219.4, 192/220, 220.2, 220.4; 74/411.5
See application file for complete search history.

(56) References Cited

U.S. PATENT DOCUMENTS
4,892,014 A * 1/1990 Morell et al. ............. 477/92
(Continued)

FOREIGN PATENT DOCUMENTS
DE  101 50 379 A1  4/2003
(Continued)

OTHER PUBLICATIONS
German Office Action issued in German Patent Application No. 11 2007 002 026.1 dated Nov. 19, 2010 (with translation).

Primary Examiner — Thomas Tarcza
Assistant Examiner — Rami Khatib
(74) Attorney, Agent, or Firm — Oliff & Berridge, PLC

(57) ABSTRACT

A vehicle control apparatus for a vehicle that includes a brake mechanism that produces braking force through the actuation of a first actuator and a shift mechanism that changes the shift position of a transmission through the actuation of a second actuator. The vehicle control apparatus includes: a controller that controls the electric power supplied to the first actuator and that controls the electric power supplied to the second actuator; a first electric power supply unit that supplies electric power to the controller; a second electric power supply unit that supplies electric power to the first actuator; and a third electric power supply unit that supplies electric power to the second actuator. An actuator control unit in the controller controls the electric power supplied to the second actuator from the second electric power supply unit or from the third electric power supply unit when the second actuator is not able to operate using the electric power supplied from the first electric power supply unit.

18 Claims, 8 Drawing Sheets

U.S. PATENT DOCUMENTS

| | | | |
|---|---|---|---|
| 5,696,679 A | 12/1997 | Marshall et al. | |
| 5,827,149 A * | 10/1998 | Sponable | 477/92 |
| 2003/0144112 A1 | 7/2003 | Burgbacher et al. | |
| 2003/0233179 A1* | 12/2003 | Matsubara et al. | 701/36 |
| 2004/0011609 A1 | 1/2004 | Schmid | |
| 2004/0192498 A1 | 9/2004 | Lindenschmidt et al. | |
| 2007/0164608 A1 | 7/2007 | Streit et al. | |

FOREIGN PATENT DOCUMENTS

| | | |
|---|---|---|
| DE | 101 57 459 CI | 5/2003 |
| DE | 103 22 125 A1 | 12/2004 |
| DE | 10 2004 047 100 B3 | 3/2006 |
| JP | A 59-23754 | 2/1984 |
| JP | A 62-292536 | 12/1987 |
| JP | A 11-285108 | 10/1999 |
| JP | A-11-325243 | 11/1999 |
| JP | A-2001-213288 | 8/2001 |
| JP | A 2001-221338 | 8/2001 |
| JP | A-2002-243033 | 8/2002 |
| JP | A-2003-49942 | 2/2003 |
| JP | A-2004-505225 | 2/2004 |
| JP | A 2004-92849 | 3/2004 |
| JP | A-2004-513307 | 4/2004 |
| JP | A-2004-256013 | 9/2004 |
| JP | A 2004-338577 | 12/2004 |
| JP | A 2004-359169 | 12/2004 |
| JP | A 2005-170070 | 6/2005 |
| WO | WO 99/38738 A1 | 8/1999 |
| WO | WO 2005/110814 A1 | 11/2005 |

* cited by examiner

VEHICLE CONTROL APPARATUS, VEHICLE CONTROL METHOD, COMPUTER PROGRAM FOR IMPLEMENTING SAME METHOD, AND DATA STORAGE MEDIUM STORING SAME COMPUTER PROGRAM

BACKGROUND OF THE INVENTION

1. Field of the Invention

The invention relates to the control of electric power supplied to a brake mechanism that produces braking force using an actuator in accordance with electric signals corresponding to brake operation amount and to a shift mechanism that changes the shift position using an actuator in accordance with electric signals corresponding to shift operation.

2. Description of the Related Art

A shift-by-wire shift mechanism is known that changes the shift position of a transmission using an actuator, such as a motor, in accordance with the shift operation by the driver. Likewise, a brake-by-wire brake mechanism is known that produces braking force using an actuator in accordance with the braking operation by the driver.

For example, Japanese Patent Application Publication JP-A-2004-256013 describes a parking brake apparatus that reliably prevents a brake mechanism portion from being frozen in an activated state. The parking brake apparatus includes: the brake mechanism portion that applies braking forces to the wheels of the vehicle; a brake actuator that actuates the brake mechanism portion; parking brake commanding means for outputting parking brake command signals; outside temperature sensor for detecting the temperature outside the vehicle and outputting outside temperature detection signals corresponding to the detected outside temperature; and controller. When receiving the parking brake command signals, the controller executes a parking brake control which controls the brake actuator such that braking force is produced at the brake mechanism portion. However, when detecting, based on the outside temperature detection signals from the outside temperature sensor, that the outside temperature falls below a freezing point, the controller executes a brake-release control which controls the brake actuator to maintain the brake mechanism portion in a released state even if the parking brake command signals are input.

According to the parking brake apparatus described in the above publication, it is possible to reliably prevent the brake mechanism portion from being frozen in an activated state.

However, if an actuator-driven brake mechanism and an actuator-driven shift mechanism are powered by a common electric power source, if a power failure of the common power source occurs, both the brake mechanism and the shift mechanism are rendered inoperative.

Because the drive wheels can not be locked by the parking lock mechanism and braking force can not be produced at the brake mechanism when the brake mechanism and the shift mechanism are both inoperative, the stationary state of the vehicle may not be maintained despite the driver' attempt to control the shift mechanism or to control the brake mechanism.

Thus, the parking brake apparatus described in the above publication is designed to perform the control that simply releases the parking brake at a low temperature, and it does not address the possibility of power failure of the common power source.

SUMMARY OF THE INVENTION

The invention provides a vehicle control apparatus that avoids a situation in which a both brake mechanism and a shift mechanism are rendered inoperative due to a power failure of a main electric power supply.

A vehicle having a brake mechanism that produces braking force through the actuation of a first actuator and a shift mechanism that changes the shift position of a transmission through the actuation of a second actuator may be equipped with the vehicle control apparatus according a first aspect of the invention. The vehicle control apparatus includes: a controller that controls the electric power supplied to the first actuator based on signals indicating the state of a brake operation member operated by a driver to control the brake mechanism and that controls the electric power supplied to the second actuator based on signals indicating the state of a shift operation member operated by the driver to control the shift mechanism; a first electric power supply unit that supplies electric power to the controller; a second electric power supply unit that supplies electric power to the first actuator; and a third electric power supply unit that supplies electric power to the second actuator. The controller includes an actuator control unit that controls the electric power supplied to the second actuator from the second electric power supply or from the third electric power supply when a control condition that the second actuator is not able to operate using the electric power supplied from the first electric power supply unit is satisfied.

According to the vehicle control apparatus of the first aspect of the invention, even if the second actuator becomes inoperative due to a power failure of the first electric power supply unit (e.g., battery as a main electric power source) due to, for example, a decrease in the voltage of the first electric power supply unit, breaking of electric power cables or wires, failure or malfunction of a corresponding electric power generator (e.g., alternator, motor-generator), etc., electric power supplied to the second actuator from the second electric power supply unit or from the third electric power supply unit is controlled so that at least the shift mechanism remains operative. Thus, a situation can be avoided in which both of the brake mechanism and the shift mechanism become inoperative due to a power failure of the first electric power supply unit. That is, the stationary state of the vehicle can be maintained as intended by the driver. As such, according to the vehicle control apparatus of the first aspect of the invention, at least one of the brake mechanism and the shift mechanism remains operative if the main electric power source fails. Note that the vehicle control method of the nineteenth aspect of the invention, the computer program of the twentieth aspect of the invention provide the same effects and advantages as those obtained with the vehicle control apparatus of the first aspect of the invention.

The vehicle control apparatus of the second aspect of the invention is similar to that of the first aspect of the invention, but includes the following additional features. In particular, the third electric power supply unit includes an electric power source and a relay, provided on an electric power line between the electric power source and the second actuator, and the controller includes a relay control unit that controls the relay based on the electric power supplied from the first electric power supply unit and the electric power supplied from the second electric power supply unit.

According to the vehicle control apparatus of the second aspect of the invention, even if the second actuator becomes inoperative due to a power failure of the first electric power supply unit and the voltage of the second electric power supply unit is insufficient, the controller switches the relay such that the third electric power supply unit supplies electric power to the second actuator so that the second actuator remains operative. Thus, a situation can be avoided in which both of the brake mechanism and the shift mechanism become inoperative due to a power failure of the first electric power supply unit. Further, because the brake mechanism is operative when the first electric power supply unit is in a normal state and when the first electric power supply unit is in a power failure state but the electric power of the second electric power supply unit has not yet been exhausted, the stationary state of the vehicle can be maintained even if the connection between the third electric power supply unit and the second actuator is interrupted. By doing so, the unnecessary use of electric power of the third electric power supply unit may be minimized.

The vehicle control apparatus of the third aspect of the invention is similar to that of the second aspect of the invention, but may include the following additional feature. Specifically, the relay control unit may energize the relay when the second actuator is not able to operate using the electric power supplied from the first electric power supply unit.

According to the vehicle control apparatus of the third aspect of the invention, when the control condition comes into effect, the relay is energized, so that the third electric power supply unit supplies electric power to the second actuator. Therefore, even when the second actuator becomes inoperative due to a power failure of the first electric power supply unit, the second actuator may operate using the electric power supplied from the third electric power supply unit, so that at least the shift mechanism remains operative. Thus, a situation can be avoided in which both of the brake mechanism and the shift mechanism become inoperative due to a power failure of the first electric power supply unit. Further, when the first electric power supply unit is in a normal state, the connection between the third electric power supply unit and the second actuator may be interrupted. By doing so, the unnecessary use of electric power of the third electric power supply unit may be minimized.

The vehicle control apparatus of the fourth aspect of the invention is similar to that of the third aspect of the invention, but further includes a first vehicle speed determining portion that determines the speed of the vehicle and a first voltage determining portion that determines the voltage supplied from the second electric power supply unit. According to the vehicle control apparatus of the fourth aspect of the invention, the relay controller also may energizes the relay when the speed determined by the first vehicle speed determining portion is below a predetermined speed and/or the voltage determined by the first voltage determining portion is below a predetermined voltage According to the vehicle control apparatus of the fourth aspect of the invention, the relay is energized so that the second actuator operates using the electric power supplied from the third electric power supply unit when the speed determined by the first vehicle speed determining portion is below a predetermined speed (e.g., speed corresponding to a substantially stationary state of the vehicle) and/or the voltage determined by the first voltage determining portion is below a predetermined voltage (e.g., the lower limit of the operation voltage of an electronic control unit provided as the controller), as well as when the second actuator is not able to operate using the electric power supplied from the first electric power supply unit. As such, when there is a failure of the first electric power supply unit and the electric power of the second electric power supply unit is exhausted, the second actuator may operate using the electric power supplied from the third electric power supply unit, and therefore at least the shift mechanism remains operative. As such, a situation can be avoided in which both of the brake mechanism and the shift mechanism become inoperative when a power failure of the first electric power supply unit occurs.

The vehicle control apparatus of the fifth aspect of the invention incorporates the structures of the vehicle control apparatus of the fourth aspect of the invention and further includes an electronic control unit as the controller. In addition, the predetermined voltage may be higher than a minimum operating voltage of the electronic control unit.

According to the vehicle control apparatus of the fifth aspect of the invention, a state before the electric power supplied from the second electric power supply unit decreases below the minimum operating voltage of the electric control unit, which is provided as the controller, can be detected based on the fact that the voltage determined by the first voltage determining portion falls below the predetermined voltage. Thus, the relay can be energized before the electronic control unit, which is provided as the controller, becomes inoperative.

The vehicle control apparatus of the sixth aspect of the invention is similar to those of the first to fifth aspects of the invention, but includes the following additional feature. Specifically, the actuator control unit may controls the electric power supplied to the second actuator from the second electric power supply unit or from the third electric power supply unit to change the shift position to a parking position.

According to the vehicle control apparatus of the sixth aspect of the invention, when the control condition is satisfied, the parking lock mechanism of the transmission is activated as the shift position is changed to the park position, whereby the stationary state of the vehicle may be maintained.

The vehicle control apparatus of the seventh aspect of the invention is similar to those of the first to sixth aspects of the invention, but includes the following additional feature. Specifically, the control condition is satisfied when the voltage or current supplied from the first electric power supply unit to the controller falls below a predetermined value.

According to the vehicle control apparatus of the seventh aspect of the invention, assuming that the predetermined value is set to, for example, the lower limit of the operation voltage or operation current of the second actuator, it may be determined that the first electric power controller is in a power failure state when the voltage or current supplied from the first electric power supply unit to the controller falls below the predetermined value.

The vehicle control apparatus of the eighth aspect of the invention is similar to those of the first to sixth aspects of the invention, but further may include a second voltage determining portion that determines the voltage supplied from the first electric power supply unit. According to the vehicle control apparatus of the eighth aspect of the invention, the control condition is satisfied when the determined voltage falls below a predetermined voltage.

According to the eighth aspect of the invention, assuming that the predetermined value is set to, for example, the lower limit of the operation voltage of the second actuator, it can be determined that the first electric power supply unit is in a power failure state when the fact that the voltage supplied from the first electric power supply unit to the controller is below the predetermined value.

The vehicle control apparatus of the ninth aspect of the invention is similar to that of the eighth aspect of the invention, but may include the following additional feature. Specifically, the controller is an electronic control unit and the second voltage determining portion is provided in the electronic control unit.

According to the vehicle control apparatus of the ninth aspect of the invention, a power failure in the first electric power supply unit may be detected using the second voltage determining portion in the electronic control unit provided as the controller.

The vehicle control apparatus of the tenth aspect of the invention is similar to those of the vehicle control apparatuses of the first to ninth aspects of the invention, but further may include a second vehicle speed determining portion that determines the speed of the vehicle. According to the vehicle control apparatus of the tenth aspect of the invention, the actuator control unit controls the electric power supplied to the second actuator from the second electric power supply unit or from the third electric power supply unit to change the shift position when the speed determined by the second vehicle speed portion reaches a speed indicating that the vehicle is stationary.

According to the vehicle control apparatus of the tenth embodiment, when the speed determined by the second vehicle speed determining portion reaches a speed indicating that the vehicle is stationary, the electric power supplied to the second actuator from the second electric power supply unit or from the third electric power supply unit is controlled to change the shift position to, for example, the parking position. As such, the parking lock mechanism is prevented from being activated while the vehicle is moving. On the other hand, when the vehicle is stationary, the parking lock mechanism is activated to maintain the stationary state of the vehicle even if the first electric power supply unit is in a power failure state.

The vehicle control apparatus of the eleventh aspect of the invention is similar to that of the tenth aspect of the invention, but further may include a movement amount determining portion that the amount of movement of the vehicle in the lateral direction or in the turning direction. According to the vehicle-control apparatus of the tenth aspect of the invention, the actuator control unit may prohibits the supply of electric power to the second actuator when the amount of movement of the vehicle in the lateral direction or in the turning direction exceeds a predetermined amount.

The vehicle may slip if the second actuator is activated to change the shift position to the parking position and thus activate the parking lock mechanism when the vehicle is moving in the lateral direction or in the turning direction on a road surface having a low frictional coefficient (e.g., icy road surface). According to the vehicle control apparatus of the eleventh aspect of the invention, such slipping of the vehicle may be prevented because the second actuator is activated when the vehicle is not moving in the lateral direction or in the turning direction.

The vehicle control apparatus of the twelfth aspect of the invention is similar to those of the first to eleventh aspects of the invention, but further may include a getting-out intention determining portion that determines whether the driver or other occupant intends to get out of the vehicle. According to the vehicle control apparatus of the eleventh aspect of the invention, the actuator control unit controls the electric power supplied to the second actuator from the second electric power supply unit or from the third electric power supply unit to change the shift position when the getting-out intention determining portion determines that the driver or other occupant intends to get out of the vehicle.

According to the vehicle control apparatus of the twelfth aspect of the invention, because the electric power supplied to the second actuator is controlled to change the shift position to, for example, the parking position when the getting-out intention determining portion determines that the driver or other occupant intends to get out of the vehicle, the parking lock mechanism is prevented from being actuated when the vehicle is moving.

The vehicle control apparatus of the thirteenth aspect of the invention is similar to that of the twelfth aspect of the invention, but includes the following additional feature. Specifically, the getting-out intention determining portion determines the driver or other occupant has left his or her seat and/or whether a door of the vehicle is open.

According to the vehicle control apparatus of the thirteenth aspect of the invention, an intention of the driver or other occupant to get out of the vehicle can be determined based on whether the driver or other occupant has left his or her seat and whether a door of the vehicle is open has been detected.

The vehicle control apparatus of the fourteenth aspect of the invention is similar to those of the first to eleventh aspects of the invention, but further may include a vehicle stop intention determining portion determines whether the driver intends to stop the vehicle. According to the vehicle control apparatus of the fourteenth aspect of the invention, the actuator control unit controls the electric power supplied to the second actuator from the second electric power supply unit or from the third electric power supply unit when the vehicle stop intention determining portion determines that the driver intends to stop the vehicle.

According to the vehicle control apparatus of the fourteenth aspect of the invention, the electric power supplied to the second actuator from the second electric power supply unit or from the third electric power supply unit is controlled when it is determined that the driver intends to stop the vehicle (e.g., when the brake is actuated after the shift lever has been shifted to the position corresponding to the parking position). Thus, the parking lock mechanism is prevented from being activated while the vehicle is moving. On the other hand, when the vehicle is stationary, the parking lock mechanism is activated to maintain the stationary state of the vehicle.

The vehicle control apparatus of the fifteenth aspect of the invention is similar to that of the fourteenth aspect of the invention, but may include the following additional feature. Specifically, the vehicle stop intention determining portion determines at least one of a state where a brake pedal is being depressed by the driver while the shift lever being at a parking position and a state where a parking brake being operated by the driver.

According to the vehicle control apparatus of the fifteenth aspect of the invention, an intention of the driver to stop the vehicle can be determined based on the fact that the state where the brake pedal is being depressed by the driver with the shift lever being at the parking position or the state where the parking brake being operated by the driver has been detected.

The vehicle control apparatus of the sixteenth aspect of the invention is similar to those of the first to fifteenth aspects of the invention, but further may include a third voltage determining portion that determines the voltage supplied from the third electric power supply unit. According to the vehicle control apparatus of the sixteenth aspect of the invention, the actuator control unit controls the electric power supplied to the second actuator to change the shift position when the voltage determined by the third voltage determining portion falls below a predetermined voltage.

According to the vehicle control apparatus of the sixteenth aspect of the invention, it may be determined that the electric power of the third electric power supply unit is exhausted when the voltage supplied from the third electric power supply unit falls below the predetermined voltage. Therefore, the parking lock mechanism can be activated beforehand using the actuator, and thus the stationary state of the vehicle can be maintained appropriately.

The vehicle control apparatus of the seventeenth aspect of the invention is similar to those of the first to ninth aspects of the invention, but may include the following additional feature. Specifically, the actuator control unit controls the electric power supplied to the second actuator from the second electric power supply unit or from the third electric power supply unit when a predetermined condition is satisfied, even if the electric power supplied from the second electric power supply unit is sufficient to power the first actuator.

According to the vehicle control apparatus of the seventeenth aspect of the invention, even when the electric power supplied from the second electric power supply unit is sufficient to power the first actuator, the electric power supplied to the second actuator from the second electric power supply unit or from the third electric power supply unit is controlled if a predetermined condition is satisfied (e.g., if it is estimated that there will be no need to operate the first actuator afterwards). Therefore, for example, if it is determined that there will be no need to operate the first actuator after the condition is satisfied, the electric power of the second electric power supply unit or the electric power of the third electric power supply unit may be mainly used to power the second actuator. Thus, the stationary state of the vehicle is maintained in a more reliable manner.

The vehicle control apparatus of the eighteenth aspect of the invention is similar to that of the seventeenth aspect of the invention, but further may include: a first supply voltage determining portion that determines the voltage supplied from the second electric power supply unit; and a second supply voltage determining portion that determines the voltage supplied from the third electric power supply unit. According to the vehicle control apparatus of the eighteenth aspect of the invention, the actuator control unit controls the electric power supplied to the second actuator to change the shift position when the voltage supplied from the second electric power supply unit falls below a predetermined voltage or when the voltage supplied from the third electric power supply unit falls below a predetermined voltage.

According to the vehicle control apparatus of the eighteenth aspect of the invention, it can be determined that the electric power of the second electric power supply unit is exhausted based on the fact that the voltage supplied from the second electric power supply unit falls below the predetermined voltage, and it may be determined that the electric power of the third electric power supply unit is exhausted based on the fact that the voltage supplied from the third electric power supply unit falls below the predetermined voltage. Therefore, the parking lock mechanism may be activated beforehand using the actuator, and thus the stationary state of the vehicle is maintained appropriately.

A vehicle control apparatus according to the twenty-second aspect includes a brake mechanism, which produces a braking force through actuation of a first actuator; a shift mechanism, which changes a shift position of a transmission through actuation of a second actuator; a controller that controls the electric power supplied to the first actuator based on electric signals that indicate the state of a brake operation member that a driver of the vehicle operates to control the brake mechanism and to the second actuator based on electric signals that indicate to the state of a shift operation member that driver operates to control the shift mechanism; a first electric power supply unit that supplies electric power to the controller; a second electric power supply unit that supplies electric power to the first actuator. The controller includes an actuator control unit that controls the electric power supplied to the second actuator from the second electric power supply unit when the second actuator is not able to operate using the electric power supplied from the first electric power supply unit.

The vehicle control apparatus of the twenty-third aspect of the invention is similar to that of the twenty-second aspect of the invention, but may include the following additional feature. Specifically, the controller may permit the supply of electric power from the second electric power supply unit to the second actuator when the voltage supplied from the second electric power supply unit is lower than a first predetermined voltage and equal to or higher than a second predetermined voltage.

The vehicle control apparatus of the twenty-third aspect of the invention is similar to that of the twenty-second aspect of the invention, but may include the following additional feature. Specifically, the controller may permit the supply of electric power from the second power supply unit to a second actuator if the voltage of the second power supply unit is equal to or higher than the second predetermined voltage and it is determined that there is no need to operate the first actuator afterward.

BRIEF DESCRIPTION OF THE DRAWINGS

The foregoing and further features, and advantages of the invention will become apparent from the following description of example embodiments with reference to the accompanying drawings, wherein like numerals are used to represent like elements, and wherein.

DETAILED DESCRIPTION OF EXAMPLE EMBODIMENTS

Hereinafter, example embodiments of the invention will be described with reference to the accompanying drawings. In the following, like parts and components are denoted by like numerals, and the descriptions on such elements and components will not be repeated since their functions are the same.

Figure 1:
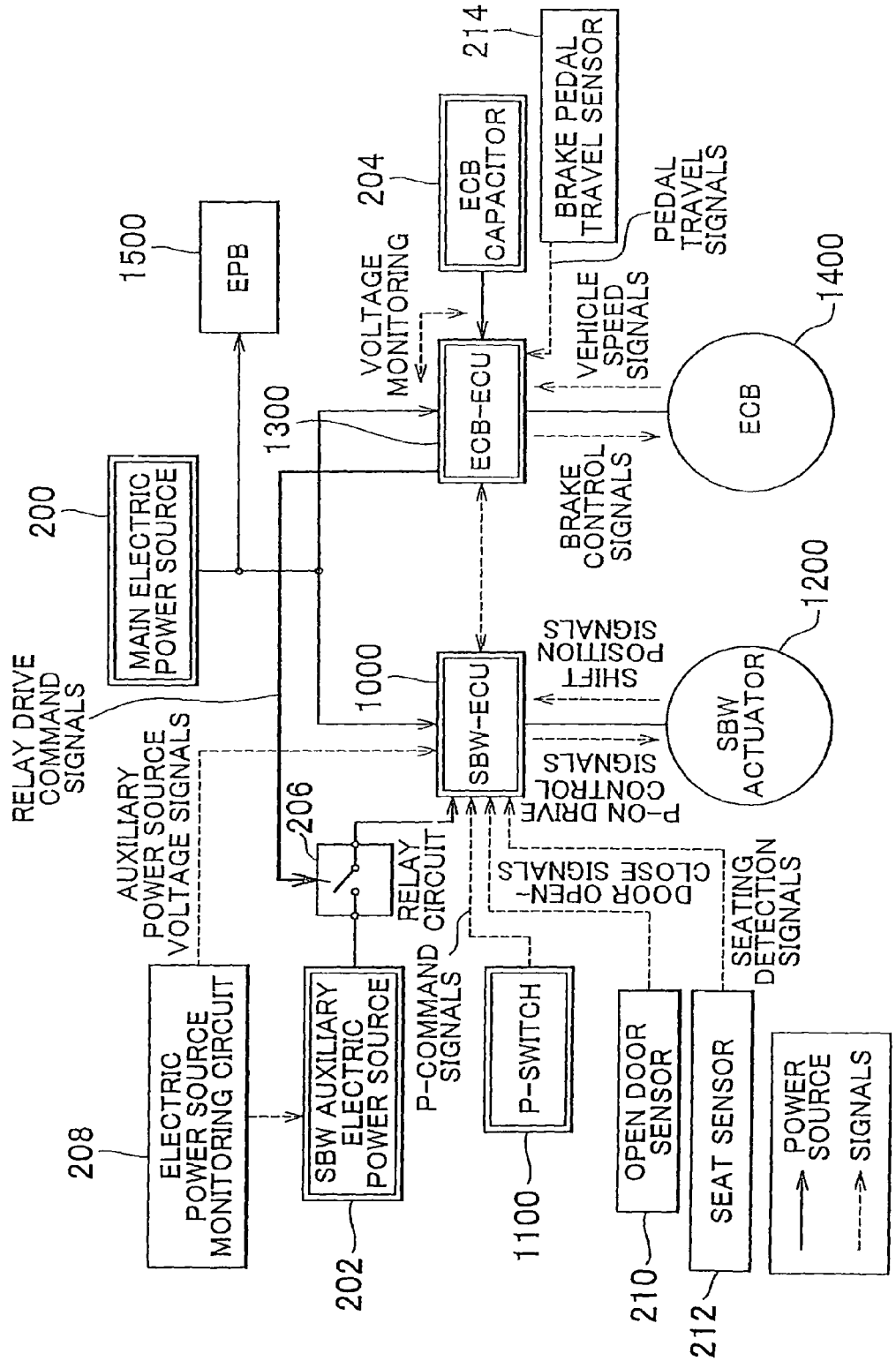
FIG. 1 is a view showing the configuration of a vehicle incorporating the vehicle control apparatus according to the first example embodiment of the invention.

Referring to FIG. 1, a vehicle incorporating a vehicle control apparatus according to a first example embodiment of the invention has an SBW-ECU (Shift-By-Wire Electronic Control Unit) 1000, a P-switch (Parking switch) 1100, an SBW actuator 1200, an ECB-ECU (Electronic Control Brake ECU) 1300, an ECB 1400, an EPB (Electronic Parking Brake) 1500, a main electric power source 200, an SBW auxiliary electric power source 202, an ECB capacitor 204, a relay circuit 206, an electric power source monitoring circuit 208, an open door sensor 210, a seat sensor 212, and a brake pedal travel sensor 214. In the first example embodiment, the vehicle may be any type of vehicle, such as a vehicle using an engine as a drive power source, a hybrid vehicle using an engine and an electric motor as drive power sources, an electric vehicle using an electric motor as a drive power source, or a fuel cell vehicle using an electric motor as a drive power source.

The vehicle control apparatus of the first example embodiment is constituted of the main electric power source 200, the SBW auxiliary electric power source 202, the ECB capacitor 204, the SBW-ECU 1000, the ECB-ECU 1300, and the relay circuit 206.

The SBW-ECU 1000 receives P-command signals (Parking command signals) form the P-switch 1100, door open-close signals from the door sensor 210, seating detection signals from the seat sensor 212, shift position signals from a shift position sensor (not shown in the drawings) provided in the SBW actuator 1200, and auxiliary electric power source voltage signals from the electric power source monitoring circuit 208.

The SBW-ECU 1000 generates P-ON drive control signals (Parking-ON drive control signals) based on the P-command signals and the shift position signals, and the SBW-ECU 1000 then transmits the generated P-ON drive control signals to the SBW actuator 1200. The P-ON drive control signals activate the SBW actuator 1200 so that the shift position of the transmission shift mechanism of the vehicle (not shown in the drawings) is set to the park position (will be referred to as "P position").

The SBW actuator 1200 switches the shift position of the transmission between the P position and a non-P position in the first example embodiment. However, this arrangement may be modified. For example, the SBW actuator 1200 may instead switch the shift position of the transmission among a forward drive position (D position), a neutral position (N position), a reverse drive position (R position), and the P position. The structure of the shift mechanism will be described later.

The main electric power source 200 supplies electric power to the SBW-ECU 1000 and to the ECB-ECU 1300. The main electric power source 200 is, for example, a battery, such as a secondary battery (e.g., lead-acid battery, nickel-hydrogen battery, lithium ion battery), or the like. However, the main electric power source 200 may be constituted by any electric power storage device as long as it can serve as an electric power storage. For example, a fuel cell unit or a capacitor may also be used as the main electric power source 200.

The main electric power source 200 may be recharged using electric power from an electric power generator provided in the vehicle. For example, if the vehicle uses an engine as its drive power source, the main electric power source 200 is recharged by the electric power generated by an alternator. If the vehicle uses an electric motor as its drive power source, the main electric power source 200 is recharged by the electric power generated by a motor generator.

The SBW-ECU 1000 is connected to the SBW auxiliary electric power source 202 via the relay circuit 206. The relay circuit 206 is normally in an interrupted state (normally open circuit). When receiving relay drive signals from the ECB-ECU 1300, the relay circuit 206 switches from the interrupted state to the energized state. Energizing the relay circuit 206 electrically connects the SBW-ECU 1000 and the SBW auxiliary electric power source 202, so that the SBW auxiliary electric power source 202 starts to supply electric power to the SBW-ECU 1000.

Like the main electric power source 200, the SBW auxiliary electric power source 202 is constituted by, for example, a battery (e.g., a secondary battery) or a capacitor.

The electric power source monitoring circuit 208 is connected to the SBW auxiliary electric power source 202. The electric power source monitoring circuit 208 monitors the usage of electric power of the SBW auxiliary electric power source 202 by detecting the voltage of the SBW auxiliary electric power source 202. Note that the electric power source monitoring circuit 208 may alternatively be adapted to detect the voltage of the main electric power source 200. The electric power source monitoring circuit 208 transmits the auxiliary electric power source voltage signals indicating the detected voltage of the SBW auxiliary electric power source 202 to the SBW-ECU 1000.

The ECB capacitor 204 supplies electric power to the ECB-ECU 1300. Note that the ECB capacitor 204 may be replaced by other electric power storage device, such as a battery (e.g., secondary battery). The ECB capacitor 204 starts supplying electric power to the ECB-ECU 1300 when the voltage of the main electric power source 200 has decreased down to a power failure level.

The P-switch 1100 is provided near the driver's seat in the passenger compartment of the vehicle. The P-switch 1100 may be, for example, a button, a lever, or the like. The P-command signals are transmitted to the SBW-ECU 1000 in response to the operation of the P-switch 1100.

The ECB-ECU 1300 receives the vehicle speed signals transmitted from a wheel speed sensor (not shown in the drawings) that is provided at a wheel of the vehicle. When the driver steps on the brake pedal, which is provided as an operation member for controlling the brake mechanism, the ECB-ECU 1300 transmits brake control signals corresponding to the operation amount of the brake pedal to the ECB 1400. The ECB-ECU 1300 and the SBW-ECU 1000 are connected to each other such that various data may be bidirectionally communicated between the ECB-ECU 1300 and the SBW-ECU 1000.

The ECB 1400 is constituted of brake mechanisms provided at the respective wheels of the vehicle and the actuators for driving the respective brake mechanisms. When receiving the brake control signals from the ECB-ECU 1300, the ECB 1400 controls the actuators such that the braking forces corresponding to the received brake control signals are produced at the brake mechanisms at the respective wheels. The brake mechanisms may be, for example, disc-brake mechanisms or drum-brake mechanism.

In response the operation of a parking brake operation member, such as a parking pedal or a parking lever, the EPB 1500 activates an actuator provided in the parking brake mechanism using the electric power supplied from the main electric power source 200. As the actuator is thus activated, the parking mechanism is activated to maintain the stationary state of the vehicle.

Figure 2:
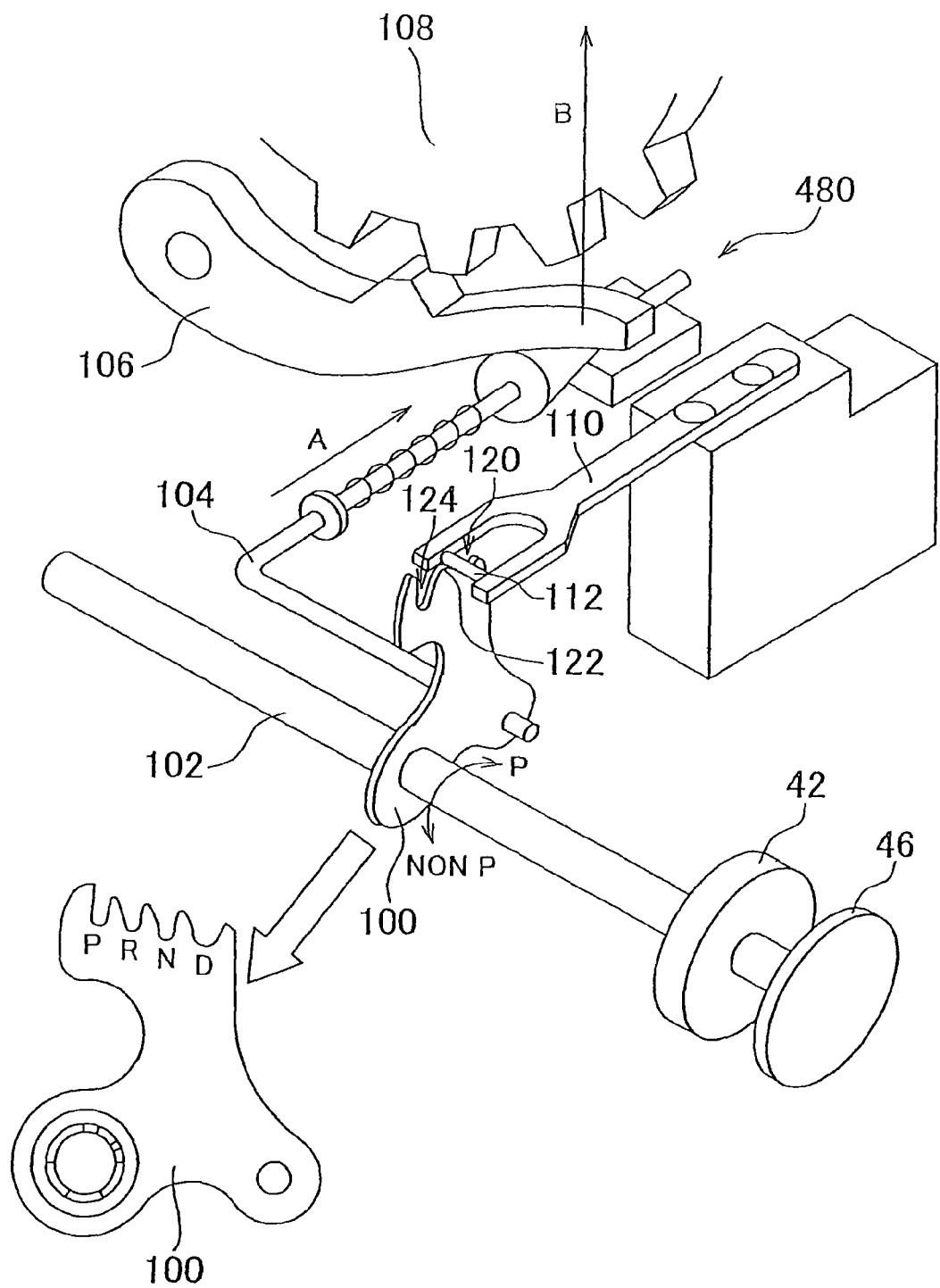
FIG. 2 is a view showing the structure of a shift mechanism.

FIG. 2 shows the structure of a shift mechanism 480 that is provided in the vehicle of the first example embodiment. The shift mechanism 480 has the P position and non-P positions (including the R, N, D positions, and optionally further including a D1 position at which the shift range of the transmission is limited to the first speed and a D2 position at which the shift range of the transmission is limited to the first and second speeds). The shift mechanism 480 includes a manual shaft 102 that is turned by an actuator 42, a detent plate 100 that pivots as the manual shaft 102 is turned, a rod 104 that moves as the detent plate 100 pivots, a parking lock gear 108 that is fixed to the output shaft of the transmission (not shown in the drawings), a parking lock pole 106 that locks the parking lock gear 108, a detent spring 110 that restricts the pivoting of the detent plate 100 so that the shift position of the transmission is fixed, and a roller 112. Note that the actuator 42 corresponds to the SBW actuator 1200 in FIG. 1.

The detent plate 100 serves as a shift member that is driven by the actuator 42 to change the shift position of the transmission. The manual shaft 102, the detent plate 100, the rod 104, the detent spring 110, and the roller 112 together serve as a shift change mechanism. An encoder 46 obtains discrete values corresponding to the amount of rotation of the actuator 42.

It is to be noted that, as shown in the enlarged plan view in FIG. 2, the detent plate 100 has four notches that are formed for the D, N, R, and P positions, respectively, although the perspective view in FIG. 2 only shows the one for the P position. In the following, the D, N, and R positions will be correctively referred to as "non-P position" and the switching between the P position and the non-P position will be described.

Shown in FIG. 2 is the state where the shift position of the transmission is at the non-P position. In this state, the parking lock gear 108 is not locked by the parking lock pole 106, and therefore the drive wheels of the vehicle can rotate freely. At this time, if the manual shaft 102 is turned clockwise, as viewed in FIG. 2, by the actuator 42, the detent plate 100 pivots and thereby pushes the rod 104 in the direction indicated by the arrow A in the FIG. 2. As the rod 104 is thus pushed, the tapered portion at the front end of the rod 104 pushes the parking lock pole 106 upward in the direction indicated by the arrow B in FIG. 2.

As the detent plate 100 pivots, the roller 112 of the detent spring 110 moves from a non-P position notch 120 to the next notch, that is, a P position notch 124, by going over a convex portion 122.

The roller 112 is provided at the detent spring 110 such that the roller 112 can rotate about its axis. As the detent plate 100 pivots to the position where the roller 112 is at the P position notch 124, the parking lock pole 106 is pushed upward to the position where the projecting portion of the parking lock pole 106 fits in between the gear teeth of the parking lock gear 108, whereby the drive shaft of the vehicle is mechanically locked. This is how the shift position of the transmission is changed to the P position from the non-P position.

For the purpose of reducing the load on the shift change mechanism (i.e., the detent plate 100, the detent spring 110, the manual shaft 102, etc.), when changing the shift position of the transmission, the SBW-ECU 1000 controls the amount of rotation of the actuator 42 to minimize the impact that occurs when the roller 112 of the detent spring 110 moves down from the concave portion 122.

Figure 3:
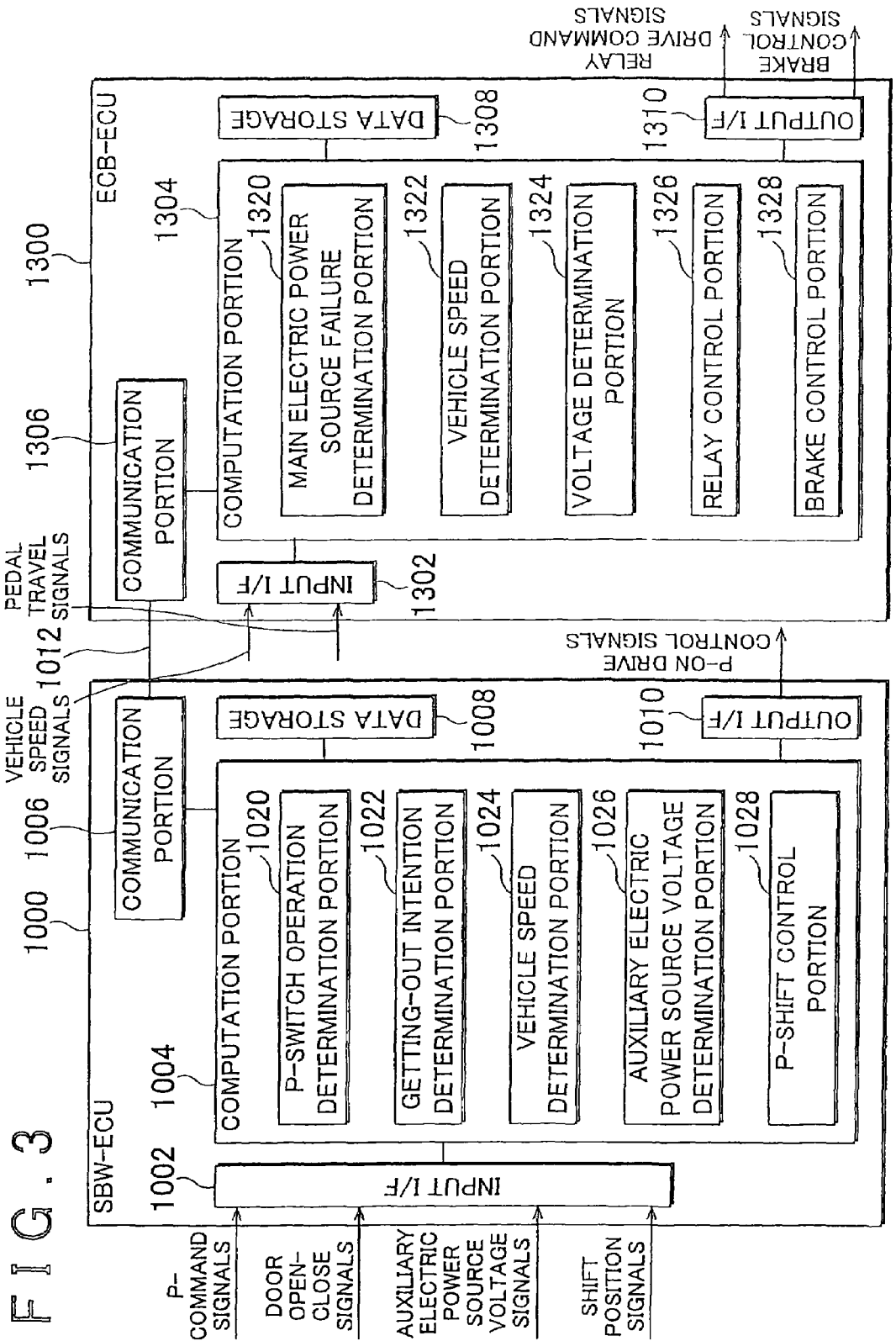
FIG. 3 is a diagram showing the function blocks of the SBW-ECU and the ECB-ECU that together serve as the vehicle control apparatus of the first example embodiment.

FIG. 3 is a block diagram showing the function blocks of the SBW-ECU 1000 and the ECB-ECU 1300 that together serve as the vehicle control apparatus of the first example embodiment.

The SBW-ECU 1000 has an input interface 1002 (will be referred to as "input I/F 1002"), a computation portion 1004, a communication portion 1006, a data storage 1008, and an output interface 1010 (will be referred to as "output I/F 1010").

The input I/F 1002 receives the P-command signals from the P-switch 1100, the door open-close signals from the door open-close sensor 210, the auxiliary electric power source voltage signals from the electric power source monitoring circuit 208, and the seating detection signals form the seating detection sensor 212. The input I/F 1002 transmits the received signals to the computation portion 1004.

The computation portion 1004 has a P-switch operation determination portion 1020, a getting-out intention determination portion 1022, a vehicle speed determination portion 1024, an auxiliary electric power source voltage determination portion 1026, and a P-shift control portion (Parking-shift control portion) 1028.

The communication portion 1006 is connected to a communication portion 1306 of the ECB-ECU 1300 via a communication line 1012. The communication portion 1006 receives the vehicle signals from the ECB-ECU 1300 and transmits them to the computation portion 1004.

The P-switch operation determination portion 1020 determines, based on the P-command signals received via the input I/F 1002, whether the P-switch 1100 has been operated. More specifically, when receiving the P-command signals via the input I/F 1002, the P-switch operation determination portion 1020 determines that the P-switch 1100 has been operated. When it is determined that the P-switch 1100 has been operated, the P-switch operation determination portion 1020 sets a P-switch operation determination flag to ON.

The getting-out intention determination portion 1022 determines, based on the door open-close signals or the seating detection signals received via the input I/F 1002, whether the driver or other occupant intends to get out of the vehicle. More specifically, the getting-out intention determination portion 1022 determines that the driver or other occupant intends to get out of the vehicle when receiving the door open-close signals indicating that any of the doors of the vehicle is open or when receiving the seating detection signals indicating that the driver or other occupant has left his or her seat.

While whether the driver or other occupant intends to get out of the vehicle is determined based on the door open-close signals or the seating detection signals in the first example embodiment, this determination may be made in any other fashion as long as it can be detected that the driver or other occupant intends to get out of the vehicle.

When it is determined that the driver or other occupant intends to get out of the vehicle, the getting-out intention determination portion 1022 sets a getting-out intention flag to ON.

The vehicle speed determination portion 1024 determines, based on the vehicle speed signals received via the communication portion 1006, whether the vehicle speed is lower than a predetermined vehicle speed V(1). The predetermined vehicle speed V(1) may be any value as long as it corresponds to a substantially stationary state of the vehicle. When it is determined that the vehicle speed is lower than the predetermined vehicle speed V(1), the vehicle speed determination portion 1024 sets a vehicle stop determination flag to ON.

The auxiliary electric power source voltage determination portion 1026 determines, based on the auxiliary electric power source voltage signals received via the input I/F 1002, whether an auxiliary electric power source voltage Vsbw is lower than a predetermined voltage Vsbw(0). If it is determined that the auxiliary electric power source voltage Vsbw is lower than predetermined voltage Vsbw(0), the auxiliary electric power source voltage determination portion 1026 sets an auxiliary electric power source voltage determination flag to ON.

When it is determined that the P-switch 1100 has been operated, the P-shift control portion 1028 generates the P-ON drive control signals and transmits them to the SBW actuator 1200 via the output I/F 1010. For example, the P-shift control portion 1028 may generate the P-ON drive control signals when that the P-switch operation determination flag is ON. Alternatively, the P-shift control portion 1028 may transmit the P-ON drive control signals when the vehicle stop determination flag is. ON, in order to prevent the parking lock gear 108 and the parking lock pole 106 from engaging each other and thereby locking the rotation of the drive wheels when the vehicle is moving.

In the first example embodiment, the functions of the P-switch operation determination portion 1020, the getting-out intention determination portion 1022, the vehicle speed determination portion 1024, the auxiliary electric power source voltage determination portion 1026, and the P-shift control portion 1028 are obtained by a CPU, which is the computation portion 1004, executing corresponding programs stored in the data storage 1008. Although these functions are software-based functions, they may alternately be provided as hardware-based functions. Note that such programs are stored in a data storage medium provided in the vehicle.

The data storage 1008 stores various information, programs, thresholds, maps, and so on, and the computation portion 1004 reads them out from the data storage 1008 as needed.

The ECB-ECU 1300 has an input I/F 1302, a computation portion 1304, the communication portion 1306, a data storage 1308, and an output I/F 1310.

The input I/F 1302 receives the vehicle speed signals from the wheel speed sensor and the pedal travel signals from the brake pedal travel sensor 214, and transmits them to the computation portion 1304.

The computation portion 1304 has a main electric power source failure determination portion 1320, a vehicle speed determination portion 1322, a voltage determination portion 1324, a relay control portion 1326, and a brake control portion 1328.

The main electric power source failure determination portion 1320 determines whether the main electric power source 200 is in a power failure state, based on the electric power supplied from the main electric power source 200 to the ECB-ECU 1300. The "power failure state" of the main electric power source 200 is the state in which the voltage or current of the main electric power source 200 has decreased to an extent that the ECB-ECU 1300, the SBW-ECU 1000, the SBW actuator 1200, and the ECB 1400 can not operate using the electric power supplied from the main electric power source 200. Such a power failure of the main electric power source 200 may occur due to, for example, depletion of the main electric power source 200, breaking of electric power cables or wires, or failure or malfunction of a corresponding electric power generator (non-rechargeable state).

The main electric power source failure determination portion 1320 detects the voltage of the electric power supplied from the main electric power source 200 to the ECB-ECU 1300. If the detected voltage is lower than a predetermined voltage Vmain(0), the main electric power source failure determination portion 1320 determines that the main electric power source 200 is in a power failure state. The main electric power source failure determination portion 1320 may be adapted to set a main electric power source failure determination flag to ON when it is determined that the main electric power source 200 is in a power failure state.

Also, if the electric power source monitoring circuit 208 is adapted to detect the voltage of the main electric power source 200, the main electric power source failure determination portion 1320 may be adapted to determine whether the main electric power source 200 is in a power failure state based on detection signals indicating the voltage of the main electric power source 200, which are received from the SBW-ECU 1000 via the communication line 1012 and the communication portion 1306.

The vehicle speed determination portion 1322 determines whether the vehicle speed is lower than a predetermined vehicle speed V(0) based on the vehicle speed signals received via the input I/F 1302. The predetermined vehicle speed V(0) may be any value as long as it corresponds to a state where the vehicle is substantially stationary. Note that the predetermined vehicle speed V(0) may be either equal to or different from the predetermined vehicle speed V(1).

When it is determined that the vehicle speed is lower than the predetermined vehicle speed V(0), the vehicle speed determination portion 1322 sets the vehicle stop determination flag to ON. The vehicle speed determination portion 1024 also makes this determination as to the vehicle speed, and therefore it is sufficient that at least one of the vehicle speed determination portion 1024 and the vehicle speed determination portion 1322 makes the same determination. Thus, the vehicle speed determination portion 1024 may be adapted to skip the determination as to the vehicle speed and sets the vehicle stop determination flag to ON if the vehicle stop determination flag has already be set to ON by the vehicle speed determination portion 1322.

The voltage determination portion 1324 determines that a voltage Vecb supplied from the ECB capacitor 204 is lower than a predetermined voltage Vecb(0). The predetermined voltage Vecb(0) is at least higher than the lower limit of the operation voltage of the ECB-ECU 1300. If it is determined that the voltage Vecb supplied form the ECB capacitor 204 is lower than the predetermined voltage Vecb(0), the voltage determination portion 1324 sets a voltage determination flag to ON.

When the main electric power source 200 is in a power failure state and the vehicle speed is lower than the predetermined vehicle speed V(0), or when the voltage Vecb supplied from the ECB capacitor 204 is lower than the predetermined voltage Vecb(0), the relay control portion 1326 generates relay drive command signals for activating the relay circuit 206 and transmits them to the relay circuit 206 via the output I/F 1310.

For example, the relay control portion 1326 generates the relay drive command signals when the main electric power source failure determination flag, the vehicle stop determination flag, and the voltage determination flag are all ON.

The brake control portion 1328 generates the brake control signals based on the pedal travel signals received via the input I/F 1302 and transmits them to the ECB 1400 via the output I/F 1310. At this time, the brake control portion 1328 generates the brake control signals such that the brake force corresponding to the travel of the brake pedal (operation amount of the brake pedal) is produced.

In the first example embodiment, the functions of the main electric power source failure determination portion 1320, the vehicle speed determination portion 1322, the voltage determination portion 1324, the relay control portion 1326, and the brake control portion 1328 are obtained by the CPU, which is the computation portion 1304, executing corresponding programs stored in the data storage 1308. Although these functions are software-based functions, they may alternately be provided as hardware-based functions. Note that such programs are stored in a data storage medium provided in the vehicle.

While the SBW-ECU 1000 and the ECB-ECU 1300 of the vehicle control apparatus of the first example embodiment are two separate electronic control units that are connected to each other to enable bidirectional communication therebetween, the SBW-ECU 1000 and the ECB-ECU 1300 may alternatively be combined into a single electronic control unit. In the first example embodiment, the SBW-ECU 1000 and the ECB-ECU 1300 cooperatively execute various programs stored in the data storage 1008 and the data storage 1308.

Figure 4:
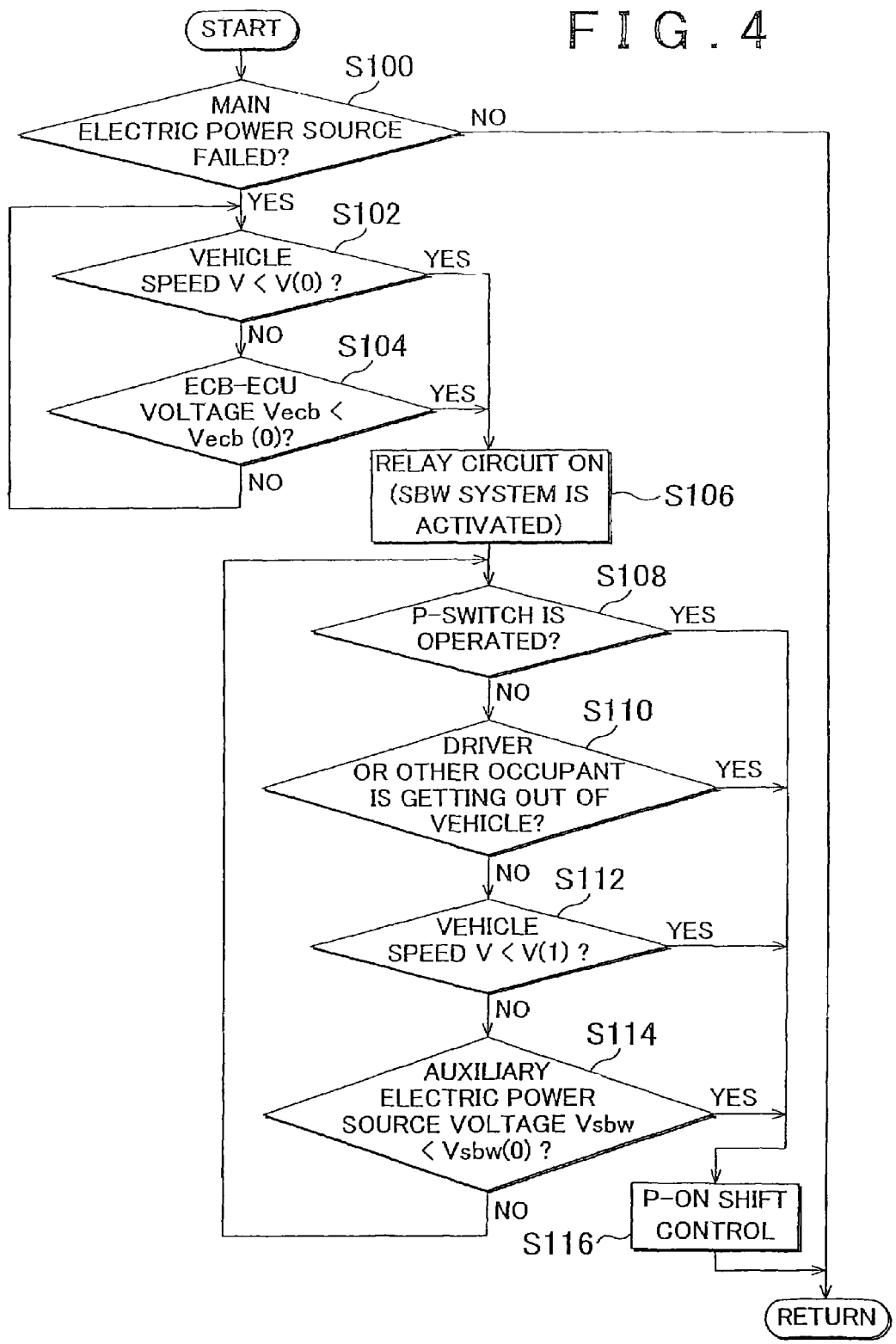
FIG. 4 is a flowchart illustrating the control algorithm for the program executed by the SBW-ECU and the ECB-ECU that together serve as the vehicle control apparatus of the first example embodiment.

Hereinafter, the control algorithm for the program executed by the SBW-ECU 1000 and the ECB-ECU 1300, which together serve as the vehicle control apparatus of the first example embodiment, will be described with reference to FIG. 4.

First, in step 100 ("step" will hereinafter be abbreviated to "S"), the ECB-ECU 1300 determines whether the main electric power source 200 is in a power failure state. If the main electric power source 200 is in a power failure state (S100: YES), the control routine proceeds to S102. If not (S100: NO), the present cycle of the control routine ends.

In S102, the ECB-ECU 1300 determines whether the vehicle speed is lower than the predetermined vehicle speed V(0). If the vehicle speed is lower than the predetermined vehicle speed V(0) (S102: YES), the control routine proceeds to S106. If not (S102: NO), the control routine proceeds to S104.

In S104, the ECB-ECU 1300 determines whether the voltage Vecb of the electric power supplied from the ECB capacitor 204 to the ECB-ECU 1300 is lower than the predetermined voltage Vecb(0). If the voltage Vecb supplied to the ECB-ECU 1300 is lower than the predetermined voltage Vecb (O) (S104: YES), the control routine proceeds to S106. If not (S104: NO), the control routine returns to S102.

In S106, the ECB-ECU 1300 activates (energizes) the relay circuit 206. Then, in S108, the SBW-ECU 1000 determines whether the P-switch 1100 has been operated. If the P-switch 1100 has been operated (S108: YES), the control routine proceeds to S116. If not (S108: NO), the control routine proceeds to S110.

In S110, the SBW-ECU 1000 determines whether the driver or other occupant intends to get out of the vehicle. More specifically, the seating detection signals or the door close-open signals indicate that the driver or other occupant has left his or her seat, the SBW-ECU 1000 determines that he or she intends to get out of the vehicle. If it is determined that the driver or other occupant intends to get out of the vehicle (S110: YES), the control routine proceeds to S116. If not (S110: NO), the control routine proceeds to S12.

In S112, the SBW-ECU 1000 determines whether the vehicle speed is lower than the predetermined vehicle speed V(1). If the vehicle speed is lower than the predetermined vehicle speed V(1) (S112: YES), the control routine proceeds to S116. If not (S112: NO), the control routine proceeds to S114.

In S114, the SBW-ECU 1000 determines whether the voltage Vsbw of the SBW auxiliary electric power source 202 is lower than the predetermined voltage Vsbw(0). If the voltage Vsbw of the SBW auxiliary electric power source 202 is lower than the predetermined voltage Vsbw(0) (S114: YES), the control routine proceeds to S116. If not (S114: NO), the control routine returns to S108.

In S116, the SBW-ECU 1000 executes a P-shift control in which the actuator 42 is activated to pivot the detent plate 100 so that the roller 112 moves to the P-position notch 124.

Next, the operation of the vehicle control apparatus of the first example embodiment, based on the configuration and control algorithm described above, will be described.

As long as the main electric power source 200 is in a normal state (S100: NO), the SBW-ECU 1000 and the ECB-ECU 1300 operate using the electric power supplied from the main electric power source 200. When powered by the main electric power source 200, the SBW-ECU 1000 activates the SBW actuator 1200 using the electric power supplied from the main electric power source 200 when the P-switch 1100 is operated by the driver, and the ECB-ECU 1300 activates the ECB 1400 using the electric power supplied from the main electric power source 200 when the brake pedal is operated by the driver.

When a power failure of the main electric power source 200 occurs (S100: YES), the vehicle speed is detected. At this time, the ECB capacitor 204 starts to supply electric power to the ECB-ECU 1300. If the detected vehicle speed is equal to or higher than the predetermined vehicle speed V(0) (S102: NO), the voltage Vecb supplied to the ECB-ECU 1300 is then detected. That is, because the main electric power source 200 is presently in a power failure state, the voltage Vecb supplied from the ECB capacitor 204 is detected. If the detected voltage Vecb is equal to or higher than the predetermined voltage Vecb(0) (S104: NO), the control routine does not proceed to S106 until the vehicle speed decreases below the predetermined vehicle speed V(0).

On the other hand, if the vehicle speed is lower than the predetermined vehicle speed V(0) (S102: YES) or if the detected voltage Vecb is lower than the predetermined voltage Vecb(0) (S104: YES), the relay circuit 206 is then activated (S106), whereby the SBW auxiliary electric power source 202 starts to supply electric power to the SBW-ECU 1000.

Then, the control routine does not proceed to S116 as long as the P-switch 1100 is not operated (S108: NO), any intention of the driver and other occupant to get out of the vehicle is not detected (S110: NO), the vehicle speed remains equal to or higher than the predetermined vehicle speed V(1) (S112: NO), and the voltage Vsbw of the SBW auxiliary electric power source 202 remains equal to or higher than the predetermined voltage Vsbw(0) (S114: NO).

The P-ON shift control (Parking-ON shift control) is executed when the P-switch 1100 being operated (S108: YES), an intention of the driver or other occupant to get out of the vehicle is detected (S 110: YES), the vehicle speed falls below the predetermined vehicle speed V(1) (S112: YES), or the voltage Vsbw of the SBW auxiliary electric power source 202 falls below the predetermined voltage Vsbw(0) (S114: YES). The P-ON shift control activates the SBW actuator 1200 so that the shift position changes to the P position from the non-P position. More specifically, at this time, the projecting portion of the parking lock pole 106 fits in between the gear teeth of the parking lock gear 108, whereby the drive wheels are locked not to rotate. Thus, the stationary state of the vehicle is maintained.

According to the vehicle control apparatus of the first example embodiment, as described above, even when a power failure of the main electric power source occurs and the SBW actuator thereby becomes inoperative, the relay is switched so that the SBW actuator operates using the electric power supplied from the SBW auxiliary electric power source, and thus at least the shift mechanism remains operative. Thus, a situation in which the brake mechanism and the shift mechanism both become inoperative due to a power failure of the main electric power source can be avoided. Therefore, even if a power failure of the main electric power source occurs, the stationary state of the vehicle can be maintained as intended by the driver. As such, according to the vehicle control apparatus of the first example embodiment, at least one of the brake mechanism and the shift mechanism remains operative during a power failure of the main electric power source.

Further, when the main electric power source is in a normal state, or when the electric power of the ECB capacitor is not yet depleted, the stationary state of the vehicle is maintained by the brake mechanism. Thus, in such a case, the stationary state of the vehicle may be maintained even if the electric power supply connection between the SBW auxiliary electric power source and the SBW-ECU is interrupted. By doing so, the unnecessary use of electric power of the SBW auxiliary electric power source is minimized.

Meanwhile, the SBW-ECU may be adapted to prohibit the use of the SBW actuator when the amount of movement of the vehicle in the lateral direction or in the turning direction exceeds a predetermined movement amount (e.g. yaw amount). For example, the vehicle may slip if the SBW actuator is activated to change the shift position of the transmission to the P position from the non-P position and thus activate the parking lock mechanism when the vehicle is moving in the lateral direction or in the turning direction on a road surface having a low frictional coefficient (e.g., icy road surface). Such slipping of the vehicle, however, is prevented if the SBW actuator is adapted to operate under the condition that the vehicle is not moving in the lateral direction or in the turning direction. The amounts of the lateral direction movement and turning direction movement of the vehicle may be detected using a G-sensor and a yaw rate sensor.

Further, the SBW-ECU may be adapted to activate the SBW actuator when it detects that the driver or other occupant intends to get out of the vehicle (e.g., the driver having left his or her seat, the vehicle door being opened). In this case, the shift position is prevented from being changed to the P position from the non-P position when the vehicle is moving. That is, the parking lock mechanism is prevented from being activated when the vehicle is moving.

Further, the SBW-ECU may be adapted to activate the SBW actuator when it detects that the driver intends to stop the vehicle (e.g., the brake being applied in the P position), as well as when it detects that the driver or other occupant intends to get out of the vehicle. In this case, too, the parking lock is prevented from being activated when the vehicle is moving; on the other hand, when the vehicle is stationary, the stationary state of the vehicle is maintained.

The vehicle control apparatus of the first example embodiment determines that the electric power of the SBW auxiliary electric power source is exhausted when the voltage supplied from the SBW auxiliary electric power source falls below the predetermined voltage Vsbw(0). Thus, the parking lock gear may be locked beforehand by moving the parking lock pole using the SBW actuator to maintain the stationary state of the vehicle.

Next, a vehicle control apparatus according to a second example embodiment of the invention will be described. The vehicle incorporating the vehicle control apparatus of the second example embodiment differs from the vehicle incorporating the vehicle control apparatus of first example embodiment in that the SBW auxiliary electric power source is not provided and electric power is supplied from the ECB capacitor to the SBW-ECU when the ECB-ECU detects that a given permission condition is satisfied.

Other components and parts of the vehicle incorporating the vehicle control apparatus of the second example embodiment are the same as those of the vehicle incorporating the vehicle control apparatus of the first example embodiment. Having the same functions, such common components and parts are denoted by the same numerals, and they will not be described in detail again.

In particular, the vehicle control apparatus of the second example embodiment is characterized in that the ECB-ECU 1300 supplies electric power from the ECB capacitor 204 to the SBW-ECU 1000 when a given permission condition is satisfied. While the SBW auxiliary electric power source 202 is not provided in the vehicle of the second example embodiment, the SBW auxiliary electric power source 202 may be provided instead. In this case, the vehicle control apparatus of the second example embodiment can work effectively, for example, in the case where the voltage of the SBW auxiliary electric power source has decreased due to a shortage of electric power of the SBW auxiliary electric power source, or other causes for power failure, and therefore the SBW-ECU 1000 and the SBW actuator 1200 can not operate using the electric power of the SBW auxiliary electric power source.

The permission condition in the second example embodiment is satisfied when the voltage Vecb of the ECB capacitor 204 is lower than a predetermined upper voltage limit Vecb(2) but equal to or higher than a predetermined lower voltage limit Vecb(3). The predetermined upper voltage limit Vecb(2) corresponds to the lower limit of the operation voltage of the ECB 1400, and the predetermined lower voltage limit Vecb(3) is equal to or higher than the lower limit of the operation voltage of the ECB-ECU 1300.

Hereinafter, the control algorithm for the program executed by the ECB-ECU 1300, which serves as the vehicle control apparatus of the second example embodiment, will be described with reference to FIG. 5.

First, in S200, the ECB-ECU 1300 determines whether the main electric power source 200 is in a power failure state. If the main electric power source 200 is in a power failure state (S200: YES), the control routine proceeds to S202. If not (S200: NO) the present cycle of the control routine ends.

In S202, the ECB-ECU 1300 determines whether the voltage Vecb of the ECB capacitor 204 is lower than the predetermined upper voltage limit Vecb(2). If the voltage of the ECB capacitor 204 is lower than the predetermined upper voltage limit Vecb(2) (S204: YES), the control routine proceeds to S206. If not (S202: NO) the control routine proceeds to S204.

In S204, the ECB-ECU 1300 prohibits the supply of electric power from the ECB capacitor 204 to the SBW-ECU 1000, making it impossible for the SBW-ECU 1000 to operate using the electric power from the ECB capacitor 204. At this time, the electric power of the ECB capacitor 204 is used to power the ECB 1400.

On the other hand, in S206, the ECB-ECU 1300 determines whether the voltage Vecb of the ECB capacitor 204 is lower than the predetermined lower voltage limit Vecb(3). If the voltage Vecb supplied from the ECB capacitor 204 is lower than the predetermined lower voltage limit Vecb(3) (S206: YES), the control routine proceeds to S210. If not (S206: NO), the control routine proceeds to S208.

In S208, the ECB-ECU 1300 permits the supply of electric power from the ECB capacitor 204 to the SBW-ECU 1000, so that the ECB capacitor 204 starts to supply electric power to the SBW-ECU 1000. Thus, if the driver operates the P-switch 1100 in this state, the SBW-ECU 1000 executes the P-ON shift control, activating the SBW actuator 1200 using the electric power from the ECB capacitor to change the shift position to the P position from the non-P position. Note that the SBW-ECU 1000 may alternatively be adapted to execute this P-ON shift control when detecting that the vehicle is substantially stationary with the vehicle speed being lower than a predetermined vehicle speed (i.e., if the vehicle stop determination flag is ON).

On the other hand, in S210, the ECB-ECU 1300 determines that it is impossible for the SBW-ECU 1000 to execute the P-ON shift control using the electric power from the ECB capacitor 204. In this case, therefore, the SBW-ECU 1000 is not powered by the ECB capacitor 204.

Next, the operation of the vehicle control apparatus of the second example embodiment, based on the configuration and control algorithm described above, will be described with reference to FIG. 6.

Figure 6:
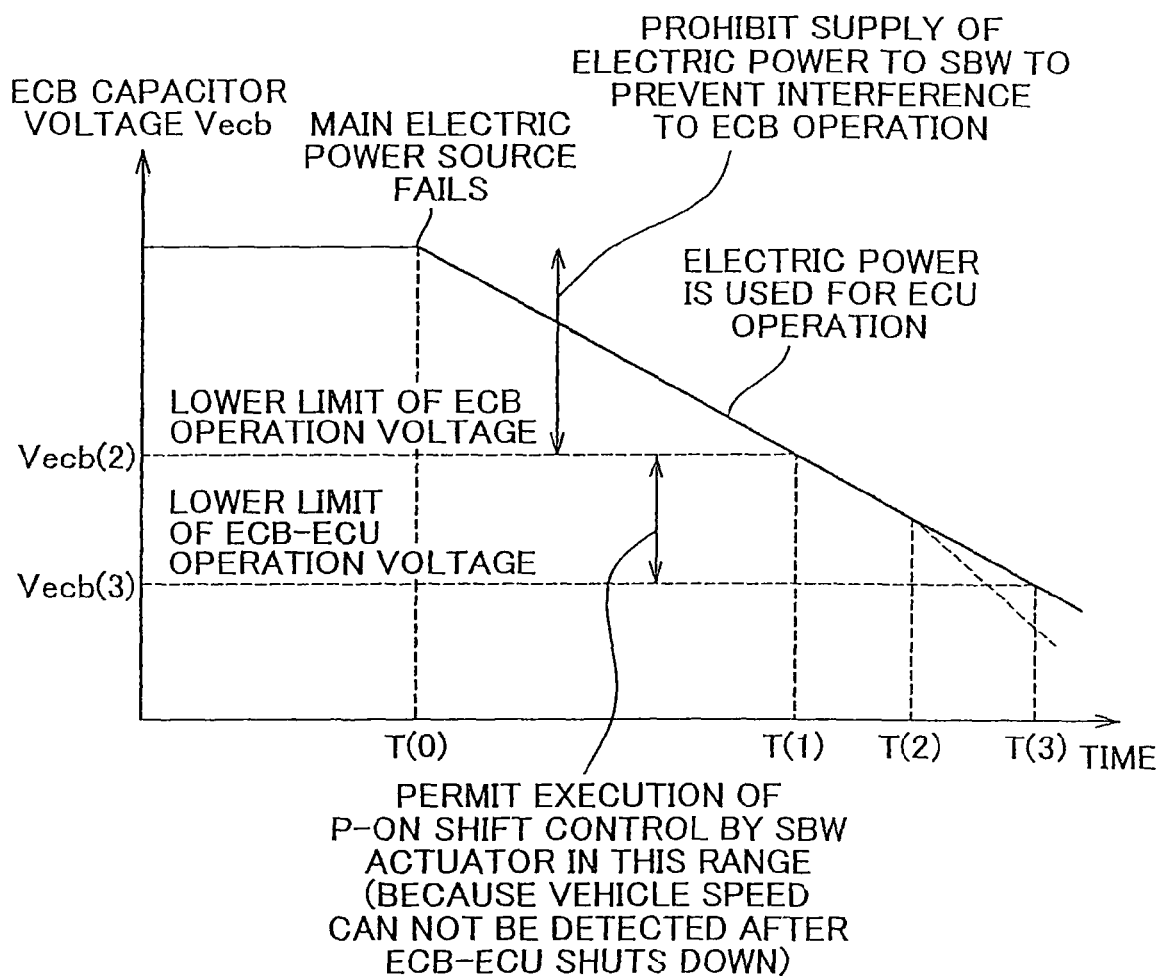
FIG. 6 is a timing chart illustrating variation of the voltage of the ECB capacitor of the second example embodiment.

In FIG. 6, the main electric power source 200 operates normally until the time T(0) (S200: NO). Thus, until the time T(0), the SBW-ECU 1000 and the ECB-ECU 1300 operate using the electric power supplied from the main electric power source 200. That is, the SBW-ECU 1000 activates the SBW actuator 1200 using the electric power supplied from the main electric power source 200 in response to the P-switch 1100 being operated, and the ECB-ECU 1300 activates the ECB 1400 using the electric power supplied from the main electric power source 200 in response to the brake pedal being operated.

Then, when a power failure of the main electric power source 200 occurs at the time T(0) (S200: YES), the ECB capacitor 204 starts to supply electric power to the ECB-ECU 1300. Afterwards, the voltage Vecb of the ECB capacitor 204 decreases as the ECB capacitor 204 continues to supply electric power to the ECB-ECU 1300.

The voltage Vecb of the ECB capacitor 204 is equal to or higher than the predetermined upper voltage limit Vecb(2) from the time T(0) to the time T(1) (S202: NO). Therefore, during this period, the ECB capacitor 204 is prohibited from supplying electric power to the SBW-ECU 1000 (S204).

The voltage Vecb of the ECB capacitor 204 is lower than the predetermined upper voltage limit Vecb(2) (S202: YES) but equal to or higher than the predetermined lower voltage limit Vecb(3) (S206: NO) from the time T(1) to the time T(3). Thus, during this period, the ECB capacitor 204 is permitted to supply electric power to the SBW-ECU 1000 (S208).

Thus, if the driver operates the P-switch 1100 in this state, the SBW actuator 1200 is activated using the electric power from the ECB capacitor 204. Assuming that the SBW actuator 1200 is activated, for example, at the time T(2), the rate of decrease in the voltage Vecb increases, as indicated by the broken line in FIG. 6, because the SBW actuator 1200 uses the electric power of the ECB capacitor 204.

After time T(2), the voltage Vecb of the ECB capacitor 204 falls below the lower limit of the operation voltage of the ECB-ECU 1300, and therefore the vehicle speed can no longer be detected. Thus, the supply of electric power from the ECB capacitor 204 to the SBW-ECU 2000 is stopped (S210).

According to the vehicle control apparatus of the second example embodiment, as described above, during a power failure of the main electric power source, the ECB capacitor is prohibited from supplying electric power to the SBW-ECU as long as the level of electric power of the ECB capacitor is in a range for powering the ECB. During this period, therefore, there is no interference with the operation of the ECB and thus the stationary state of the vehicle is maintained by the ECB. Subsequently, if the level of electric power of the ECB capacitor decreases below the lower limit for powering the ECB, the electric power of the ECB capacitor is then supplied to the SBW-ECU, and the SBW-ECU activates the shift mechanism. That is, at this time, the SBW-ECU activates the parking lock mechanism using the electric power of the ECB capacitor, whereby the stationary state of the vehicle is maintained.

Meanwhile, the SBW-ECU may be adapted to prohibit the use of the SBW actuator when the amount of movement of the vehicle in the lateral direction or in the turning direction exceeds a predetermined movement amount (e.g. yaw amount). For example, the vehicle may slip if the SBW actuator is activated to change the shift position of the transmission to the P position from the non-P position and thus activate the parking lock mechanism when the vehicle is moving in the lateral direction or in the turning direction on a road surface having a low frictional coefficient (e.g., icy road surface). Such slipping of the vehicle, however, may be prevented if the SBW actuator operates under the condition that the vehicle is not moving in the lateral direction or in the turning direction. The amounts of the lateral direction movement and turning direction movement of the vehicle may be detected using a G-sensor and a yaw rate sensor.

Next, a vehicle control apparatus according to a third example embodiment of the invention will be described. The vehicle incorporating the vehicle control apparatus of the third example embodiment differs from the vehicle incorporating the vehicle control apparatus of the second example embodiment in the content of the permission condition. Other components and parts of the vehicle incorporating the vehicle control apparatus of the third example embodiment are the same as those of the vehicle incorporating the vehicle control apparatus of the second example embodiment. Having the same functions, such common components and parts are denoted by the same numerals, and they will not be described in detail again.

The permission condition in the third example embodiment is that the voltage Vecb of the ECB capacitor 204 is equal to or higher than the predetermined lower voltage limit Vecb(3) and it is estimated that there will be no need to operate the ECB 1400 afterward. That is, the third example embodiment is characterized in that even when the electric power of the ECB capacitor 204 is sufficient to power the actuator of the ECB 1400, the electric power of the ECB capacitor 204 is used to operate the SBW actuator 1200 if the predetermined permission condition is satisfied.

The condition that "it is estimated that there will be no need to operate the ECB 1400 afterward" is considered satisfied when there is a record indicating that the vehicle was stopped by the ECB 1400 after a power failure of the main electric power source 200 and the vehicle is presently in a stationary state, the driver has been depressing the brake pedal for a predetermined time or longer, and the driver is showing his or her intension to maintain the stationary state of the vehicle.

If the vehicle stop determination flag is ON, the ECB-ECU 1300 determines that the vehicle has ever been stopped. The ECB-ECU 1300 determines whether the vehicle is presently stationary based on the vehicle speed signals from the wheel speed sensor.

Further, the ECB-ECU 1300 determines, based on the pedal travel signals from the brake pedal travel sensor 214, whether the brake pedal has been continuously depressed by an amount equal to greater than a predetermined operation amount longer than a predetermined time.

The condition that "the driver is showing his or her intention to maintain the vehicle in a stationary state" is regarded as being in effect if any one of the following conditions is in effect; the P position being selected, the EPB being in operation, the driver having left his or her seat, and the brake pedal being strongly depressed. Whether the brake pedal is being strongly depressed is determined based on the operation amount of the brake pedal. Further, the condition that "the driver is showing his or her intention to maintain the vehicle in a stationary state" may be regarded as being in effect also when the door(s) of the vehicle is open.

Hereinafter, the control algorithm for the program executed by the ECB-ECU 1300 that serves as the vehicle control apparatus of the third example embodiment will be described with reference to FIG. 7.

Figure 5:
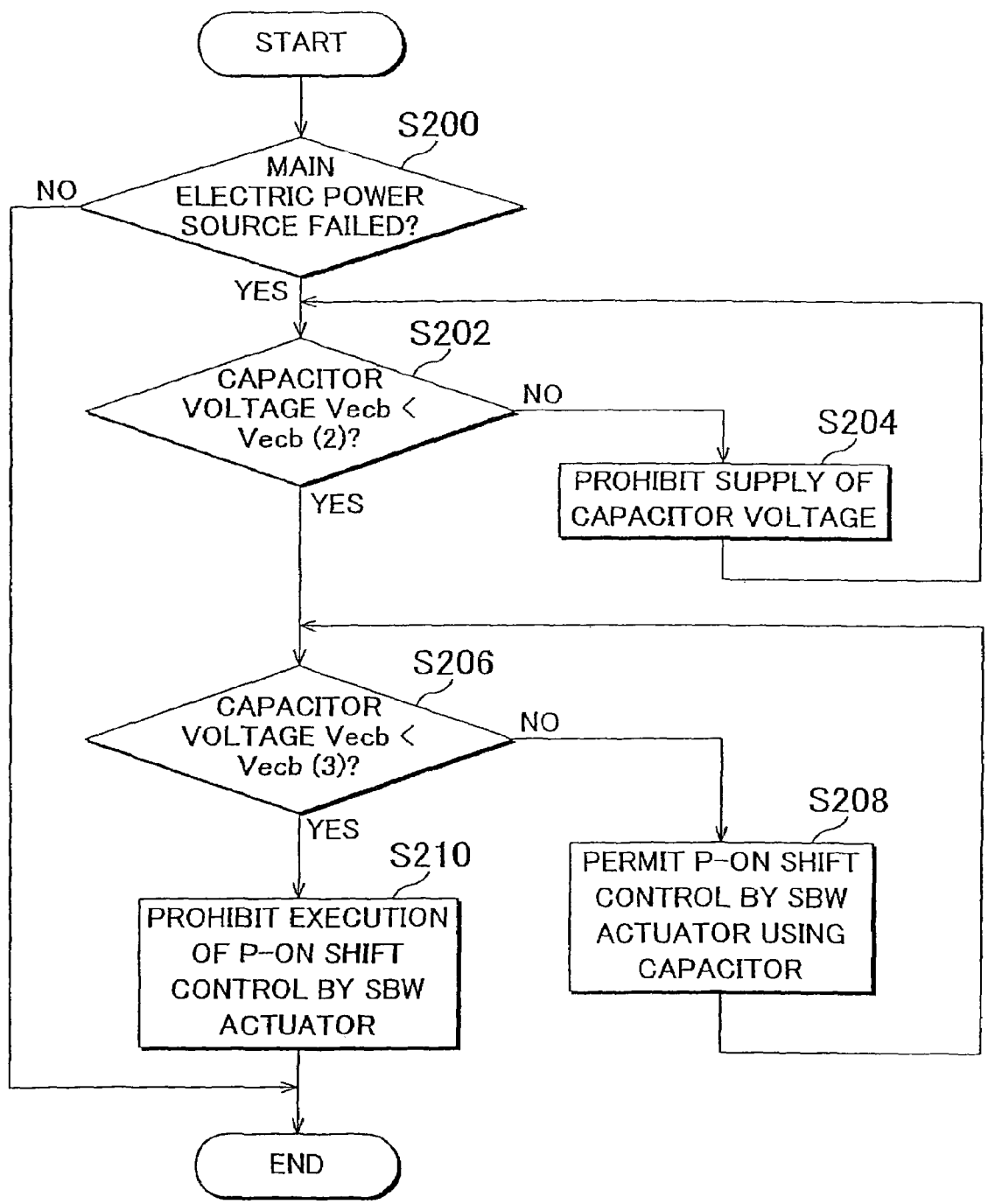
FIG. 5 is a flowchart illustrating the control algorithm for the program executed by the ECB-ECU of the second example embodiment.
Figure 7:
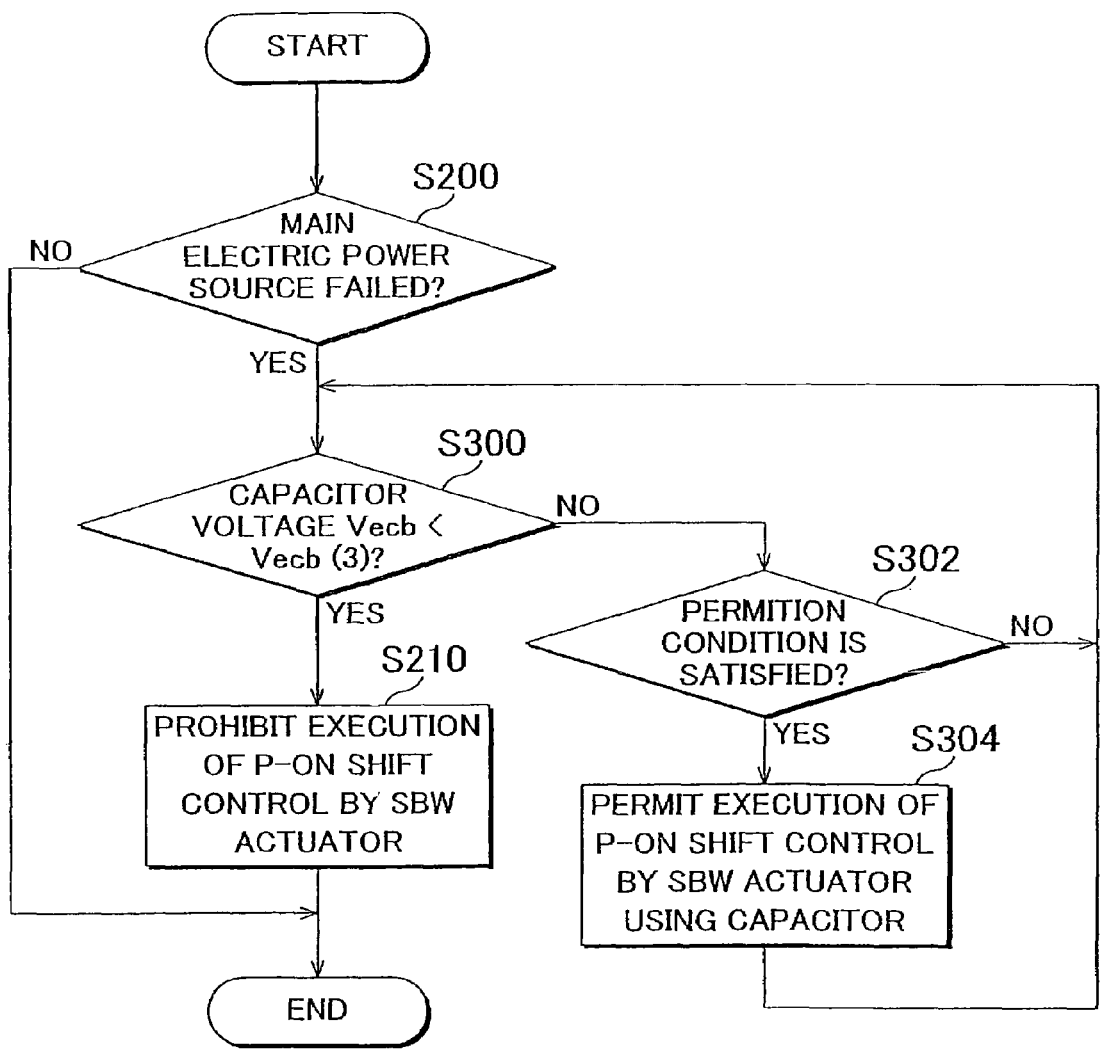
FIG. 7 is a flowchart illustrating the control algorithm for the program executed by the ECB-ECU of the third example embodiment.

In the flowchart of FIG. 7, the processes that are the same as those in the flowchart of FIG. 5 are denoted by the same step numbers, and they will not be described in detail again.

In S300, the ECB-ECU 1300 determines whether the voltage Vecb of the ECB capacitor 204 is lower than the predetermined lower voltage limit Vecb(3). If the voltage Vecb of the ECB capacitor 204 is lower than the predetermined lower voltage limit Vecb(3) (S300: YES), the control routine proceeds to S210. If not (S300: NO) the control routine proceeds to S302.

In S302, the ECB-ECU 1300 determines whether the permission condition is satisfied. The detail of this condition has been described above, and therefore it is not described here again.

In S304, the ECB-ECU 1300 permits the supply of electric power from the ECB capacitor 204 to the SBW-ECU 1000, so that the ECB capacitor 204 starts to supply electric power to the SBW-ECU 1000 via the ECB-ECU 1300. Thus, if the driver operates the P-switch 1100 in this state, the SBW-ECU 1000 executes the P-ON shift control, activating the SBW actuator 1200 using the electric power from the ECB capacitor so that the shift position of the transmission changes to the P position from the non-P position. Note that the SBW-ECU 1000 may alternatively be adapted to execute this P-ON shift control when detecting that the vehicle is substantially stationary with the vehicle speed being lower than a predetermined vehicle speed. After step S304, the control routine returns to S300.

Figure 8:
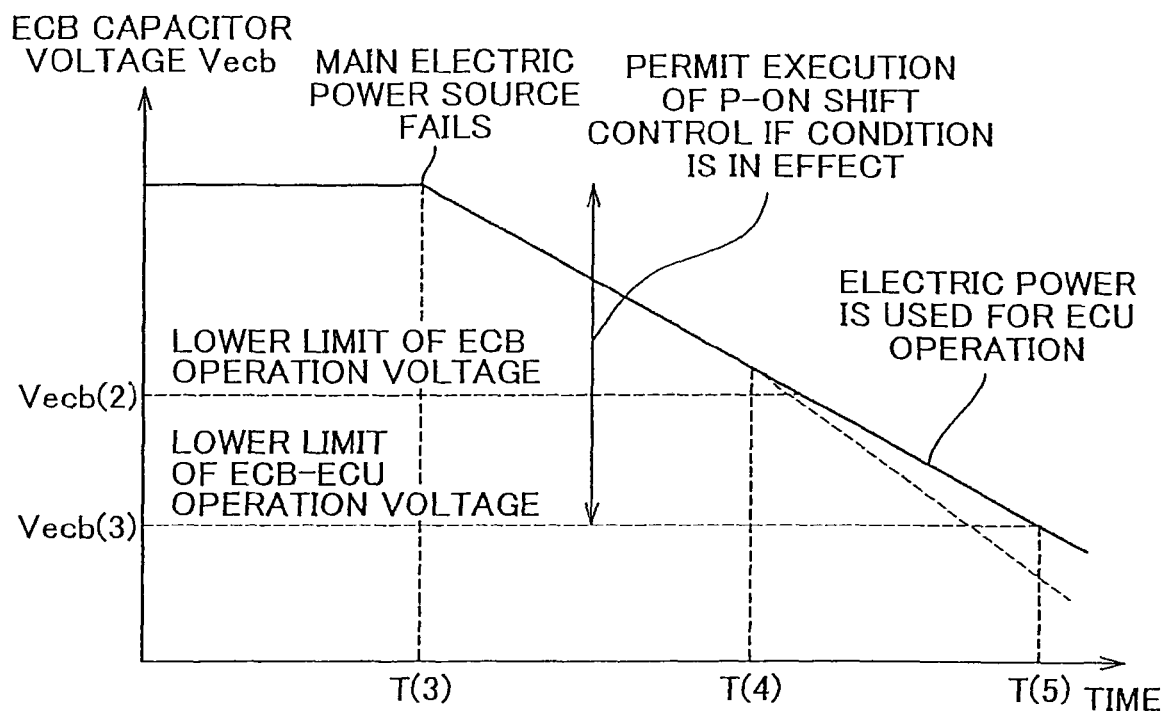
FIG. 8 is a timing chart illustrating variation of the voltage of the ECB capacitor of the third example embodiment.

Next, the operation of the ECB-ECU 1300 of the vehicle control apparatus of the third example embodiment, which is based on the configuration and control algorithm described above, will be described with reference to FIG. 8.

Referring to FIG. 7, the main electric power source 200 operates normally until the time T(3) (S200: NO). Thus, until the time T(3), the SBW-ECU 1000 and the ECB-ECU 1300 operate using the electric power supplied from the main electric power source 200. That is, the SBW-ECU 1000 activates the SBW actuator 1200 using the electric power supplied from the main electric power source 200 in response to the P-switch 1100 being operated, and the ECB-ECU 1300 activates the ECB 1400 using the electric power supplied from the main electric power source 200 in response to the brake pedal being operated.

Then, when a power failure of the main electric power source 200 occurs at the time T(3) (S200: YES), the ECB capacitor 204 starts to supply electric power to the ECB-ECU 1300. Afterwards, the voltage Vecb of the ECB capacitor 204 decreases as the ECB capacitor 204 continues to supply electric power to the ECB-ECU 1300.

During the time period from the time T(3) to the time T(5), the voltage Vecb of the ECB capacitor 204 is equal to or higher than the predetermined lower voltage limit Vecb(3) (S300: NO), and therefore it is determined whether the permission condition satisfied (S302).

The permission condition is satisfied (S302: YES) when there is a record indicating that the vehicle has been stopped by the ECB after the main electric power source 200 comes into a power failure state, the vehicle is presently stationary, the driver has been depressing the brake pedal for a predetermined time or longer, and the driver is showing his or her intention to get out the vehicle (e.g., the driver has left his seat). In this case, therefore, it is permitted to supply electric power from the ECB capacitor 204 to the SBW-ECU 1000, so that the ECB capacitor 204 starts to supply electric power to the SBW-ECU 1000. Thus, after the time T(4), the rate of decrease in the voltage Vecb increases as indicated by the broken line in FIG. 8. If the driver operates the P-switch 1100 in this state, the SBW actuator 1200 is activated using the electric power supplied from the ECB capacitor 204.

At the time T(5), the voltage Vecb of the ECB capacitor 204 falls below the lower limit of the operation voltage of the ECB-ECU, and therefore the vehicle speed can no longer be detected. Thus, the supply of electric power from the ECB capacitor 204 to the detent plate 100 is stopped (S210).

According to the vehicle control apparatus of the third example embodiment, as described above, even when the voltage of the ECB capacitor is sufficient to power the ECB, if the condition that it is estimated that there will be no need to operate the ECB afterward continues to be satisfied, electric power is supplied from the ECB capacitor to the SBW-ECU. Therefore, the P-ON shift control is immediately executed after the main electric power source comes into a power failure state, and therefore the stationary state of the vehicle can be maintained.

While the supply of electric power from the ECB capacitor to the SBW-ECU is permitted in response to the permission condition is satisfied in the third example embodiment, this arrangement is not limited to the ECB capacitor. For example, because the vehicle includes, as well as the ECB, various systems and components having auxiliary electric power sources, the auxiliary electric power sources of such systems and components may be used instead of the ECB capacitor. These other systems and components are, for example, a steer-by-wire type steering system, an air-bag system, and alarms.

Meanwhile, the SBW-ECU may be adapted to prohibit the use of the SBW actuator when the amount of movement of the vehicle in the lateral direction or in the turning direction exceeds a predetermined movement amount (e.g. yaw amount). For example, the vehicle may slip if the SBW actuator is activated to change the shift position of the transmission to the P position from the non-P position and thus activate the parking lock mechanism when the vehicle is moving in the lateral direction or in the turning direction on a road surface having a low frictional coefficient (e.g., icy road surface). Such slipping of the vehicle, however, may be prevented if the SBW actuator is adapted to operate only when the vehicle is not moving in the lateral direction or in the turning direction. The amounts of the lateral direction movement and turning direction movement of the vehicle may be detected using a G-sensor and a yaw rate sensor.

The vehicle of the third exemplary embodiment may be modified to include the SBW auxiliary electric power source. In this case, the vehicle control apparatus of the second example embodiment can work effectively, for example, if the voltage of the SBW auxiliary electric power source has decreased due to a shortage of electric power of the SBW auxiliary electric power source, or other causes for power failure, and therefore the SBW-ECU 1000 and the SBW actuator 1200 cannot operate using the electric power of the SBW auxiliary electric power source.

The voltage of the SBW auxiliary electric power source and/or the voltage of the ECB capacitor are monitored by the electric power source monitoring circuit. When the electric power source monitoring circuit detects that the voltage of the SBW auxiliary electric power source and/or the voltage of the ECB capacitor are below a predetermined voltage level, the P-ON shift control is executed. With this arrangement, when a power failure of the main electric power source occurs, the P-ON shift control is executed before the electric power of the SBW auxiliary electric power source and/or the electric power of the ECB capacitor are exhausted, and therefore the stationary state of the vehicle can be maintained.

While the invention has been described with reference to the example embodiment thereof, it is to be understood that the invention is not limited to the example embodiment and construction. To the contrary, the invention is intended to cover various modifications and equivalent arrangements. In addition, while the various elements of the example embodiment are shown in various combinations and configurations, which are example, other combinations and configurations, including more, less or only a single element, are also within the spirit and scope of the invention.

The invention claimed is:

1. A vehicle control apparatus for a vehicle that includes a brake mechanism, which produces a braking force through actuation of a first actuator, and a shift mechanism, which changes a shift position of a transmission through actuation of a second actuator, the vehicle control apparatus comprising:
a controller that controls the electric power supplied to the first actuator based on electric signals that indicate the state of a brake operation member that a driver of the vehicle operates to control the brake mechanism and to the second actuator based on electric signals that indicate the state of a shift operation member that driver operates to control the shift mechanism;
a first electric power supply unit that is designed to supply electric power to the controller and to the first and second actuators;
a second electric power supply unit that is designed and controlled to supply electric power to at least one of the first actuator and the second actuator in case of insufficient supply through said first electric power supply unit; and
a third electric power supply unit that is designed and controlled to supply electric power to the second actuator in case of insufficient supply through at least one of said first and said second electric power supply units, wherein
each of the electric power supply units is rechargeable,
the controller includes an actuator control unit that controls the electric power supplied to the second actuator for maintaining the stationary state of the vehicle from at least one of the second electric power supply unit and the third electric power supply unit when a control condition that the second actuator is not able to operate using the electric power supplied from the first electric power supply unit is satisfied,
the third electric power supply unit includes an electric power source and a relay, provided on an electric power line between the electric power source and the second actuator, and
the controller further includes a relay control unit that controls the relay based on the electric power supplied from the first electric power supply unit and the electric power supplied from the second electric power supply unit,
the relay control unit energizing the relay when the second actuator is not able to operate using the electric power supplied from the first electric power supply unit, and
the vehicle control apparatus further comprises:
a first vehicle speed determining portion that determines the speed of the vehicle; and
a first voltage determining portion that determines the voltage supplied from the second electric power supply unit, wherein
the relay control unit also energizes the relay when at least one of the speed determined by the first vehicle speed determining portion falls below a first predetermined speed and the voltage determined by the first voltage determining portion falls below a predetermined voltage.

2. The vehicle control apparatus according to claim 1, wherein
the controller is an electronic control unit, and
the predetermined voltage is higher than a minimum operating voltage of the electronic control unit.

3. The vehicle control apparatus according to claim 1, wherein
the actuator control unit controls the electric power supplied to the second actuator from the second electric power supply unit or from the third electric power supply unit to change the shift position to a parking position.

4. The vehicle control apparatus according to claim 1, wherein
the control condition is satisfied when the voltage or current supplied from the first electric power supply unit to the controller falls below a predetermined value.

5. The vehicle control apparatus according to claim 1, further comprising:
a second voltage determining portion that determines the voltage supplied from the first electric power supply unit, wherein
the control condition is satisfied when the voltage determined by the second voltage determining portion falls below a predetermined voltage.

6. The vehicle control apparatus according to claim 5, wherein
the controller is an electronic control unit, and
the second voltage determining portion is provided in the electronic control unit.

7. The vehicle control apparatus according to claim 1, further comprising:
a second vehicle speed determining portion that determines the speed of the vehicle, wherein
the actuator control unit that controls the electric power supplied to the second actuator from the second electric power supply unit or the third electric power supply unit to change the shift position when the speed determined by the second vehicle speed determining portion reaches a first predetermined speed which indicates that the vehicle is stationary.

8. The vehicle control apparatus according to claim 7, further comprising:
a movement amount determining portion that the amount of movement of the vehicle in the lateral direction or in the turning direction, wherein
the actuator control unit prohibits the supply of electric power to the second actuator when the amount of movement of the vehicle in the lateral direction or in the turning direction exceeds a predetermined amount.

9. The vehicle control apparatus according to claim 1, further comprising:
a getting-out intention determining portion that determines whether the driver or other occupant intends to get out of the vehicle, wherein
the actuator control unit controls the electric power supplied to the second actuator from the second electric power supply unit or from the third electric power supply unit to change the shift position when the getting-out intention determining portion determines that an occupant intends to get out of the vehicle.

10. The vehicle control apparatus according to claim 9, wherein the getting-out intention determining portion determines whether the driver or other occupant has left his or her seat or whether a door of the vehicle is open.

11. The vehicle control apparatus according to claim 1, further comprising:
a vehicle stop intention determining portion that determines whether the driver intends to stop the vehicle, wherein
the actuator control unit controls the electric power supplied to the second actuator from the second electric power supply unit or from the third electric power supply unit when the vehicle stop intention determining portion determines that the driver intends to stop the vehicle.

12. The vehicle control apparatus according to claim 11, wherein
the vehicle stop intention determining portion determines at least one of a state where a brake pedal is being depressed by the driver with a shift lever being at a parking position and a state where a parking brake is being operated by the driver.

13. The vehicle control apparatus according to claim 1, further comprising:
a third voltage determining portion that determines the voltage supplied from the third electric power supply unit, wherein
the actuator control unit controls the electric power supplied to the second actuator to change the shift position when the voltage determined by the third voltage determining portion falls below a predetermined voltage.

14. The vehicle control apparatus according to claim 1, wherein
the actuator control unit controls the electric power supplied to the second actuator from the second electric power supply unit or from the third electric power supply unit when a predetermined condition is satisfied, even when the electric power supplied from the second electric power supply unit is sufficient to power the first actuator.

15. The vehicle control apparatus according to claim 14, further comprising:
a first supply voltage determining portion that determines the voltage supplied from the second electric power supply unit; and
a second supply voltage determining portion that determines the voltage supplied from the third electric power supply unit, wherein
the actuator control unit controls the electric power supplied to the second actuator to change the shift position when the voltage supplied from the second electric power supply unit falls below a predetermined voltage or when the voltage supplied from the third electric power supply unit falls below a predetermined voltage.

16. A method for controlling a vehicle that includes a brake mechanism, which produces a braking force through actuation of a first actuator; a shift mechanism, which changes a shift position of a transmission through actuation of a second actuator; a first electric power supply unit, which supplies electric power to the first actuator and to the second actuator; a second electric power supply unit, which supplies electric power to at least one of the first actuator and to the second actuator in case of insufficient supply through said first electric power supply unit; and a third electric power supply unit including an electric power source and relay, provided on an electric power line between the electric power source and the second actuator, which supplies electric power to the second actuator in case of insufficient supply through at least one of said first and said second electric power supply units;
the method comprising:
controlling the electric power supplied to the first actuator based on electric signals that indicate the state of a brake operation member that a driver of the vehicle operates to control the brake mechanism;
controlling the electric power supplied to the second actuator based on electric signals that indicate the state of a shift operation member that the driver operates to control the shift mechanism;
controlling the electric power supplied to the second actuator from at least one of the second electric power supply unit and from the third electric power supply unit for maintaining the stationary state of the vehicle when the second actuator cannot operate using the electric power supplied from the first electric power supply unit;
controlling the relay based on the electric power supply from the first electric power supply unit and the electric power supply from the second electric power supply unit in;
energizing the relay when the second actuator is not able to operate using the electric power supply from the first electric power supply unit;
determining the speed of the vehicle; and
determining the voltage supply from the second electric power supply unit, and also energizing the relay when at least one of the determined speed falls below a first pre-determined speed and the determined voltage falls below a pre-determined voltage, wherein each of the electric power supply units is rechargeable.

17. A computer program comprising instructions corresponding to the method according to claim 16.

18. A data storage medium storing the program according to claim 17.

* * * * *